(12) United States Patent
Snyder et al.

(10) Patent No.: US 7,958,978 B2
(45) Date of Patent: Jun. 14, 2011

(54) MULTI-DISC BRAKE HUB ASSEMBLY WITH DISC SLIDE PINS

(75) Inventors: Marshall D. Snyder, Birch Run, MI (US); Eunjoo C. Hopkins, Farmington Hills, MI (US); Thomas V. Valvano, Saginaw, MI (US)

(73) Assignee: BWI Company Limited S.A., Luxembourg (LU)

( * ) Notice: Subject to any disclaimer, the term of this patent is extended or adjusted under 35 U.S.C. 154(b) by 963 days.

(21) Appl. No.: 11/891,103

(22) Filed: Aug. 9, 2007

(65) Prior Publication Data
US 2009/0038895 A1    Feb. 12, 2009

(51) Int. Cl.
*F16D 65/12* (2006.01)
(52) U.S. Cl. .......... 188/218 XL; 188/18 A; 267/161
(58) Field of Classification Search .......... 188/218 XL, 188/18 A; 301/6.8, 6.91; 267/161
See application file for complete search history.

(56) References Cited

U.S. PATENT DOCUMENTS

| | | | | |
|---|---|---|---|---|
| 4,043,437 | A | * | 8/1977 | Taylor .......... 192/13 R |
| 4,144,957 | A | * | 3/1979 | de Gennes .......... 192/98 |
| 4,256,209 | A | * | 3/1981 | Lupertz .......... 188/218 XL |
| 4,540,067 | A | * | 9/1985 | Meynier .......... 188/71.5 |
| 6,145,632 | A | * | 11/2000 | Rutter .......... 188/18 R |
| 6,164,421 | A | * | 12/2000 | Nakamura et al. .......... 188/71.5 |
| 6,305,510 | B1 | * | 10/2001 | Bunker .......... 188/218 XL |
| 6,374,956 | B1 | * | 4/2002 | Naeumann et al. .......... 188/18 A |
| 6,705,437 | B2 | * | 3/2004 | Severinsson et al. .......... 188/73.32 |
| 6,843,350 | B2 | * | 1/2005 | Larkin et al. .......... 188/218 XL |
| 7,374,023 | B2 | * | 5/2008 | Yamamoto .......... 188/18 A |
| 2005/0145452 | A1 | * | 7/2005 | Yamamoto .......... 188/218 XL |
| 2006/0272905 | A1 | * | 12/2006 | Schlitz et al. .......... 188/218 XL |
| 2009/0020376 | A1 | * | 1/2009 | Masoni et al. .......... 188/18 A |

FOREIGN PATENT DOCUMENTS

WO    WO 2004102027 A1 * 11/2004

* cited by examiner

*Primary Examiner* — Bradley T King
(74) *Attorney, Agent, or Firm* — Dickinson Wright PLLC

(57) ABSTRACT

A brake hub assembly including a hub defining a central axis, a plurality of guide pins, each of the plurality of guide pins extending from the hub and being generally aligned with the central axis, and a disc having at least two friction surfaces, the disc defining a plurality of guide pin receiving bores, wherein each of the plurality of guide pin receiving bores are positioned to receive an associated one of the plurality of guide pins therethrough such that the disc is moveable relative to the hub along the central axis.

10 Claims, 9 Drawing Sheets

MULTI-DISC BRAKE HUB ASSEMBLY WITH DISC SLIDE PINS

BACKGROUND

The present application is directed to multi-disc brake hub assemblies and, more particularly, to multi-disc brake hub assemblies with disc slide pins, one-piece springs or both.

Multi-disc brake assemblies typically include a hub, two discs, disc springs and a caliper assembly that includes a piston, a bracket, a fist, an inner pad, a center pad and an outer pad. The hub includes machined slots and the discs include splined teeth that slide within the slots in the hub. As brake pressure is applied, the piston advances the inner pad into the first disc, which advances the center pad into the second disc and ultimately into the outer pad, thereby applying a braking force to the discs.

Such multi-disc brake assemblies have presented several problems. In one example, the discs have exhibited a propensity for tipping out of the perpendicular plane, thereby reducing the braking performance. In a second example, corrosion on the discs and hub has inhibited the ability of the discs to freely slide, thereby presenting the risk of discs seizing to the hub.

Attempts to solve such problems have included the development of special coatings and treatments for limiting corrosion, as well as redesign adapted to reduce tipping. However, such attempts have resulting in increased costs and more complex manufacturing and assembly requirements.

Accordingly, there is a need for a multi-disc brake hub assembly adapted to reduce disc tipping, while providing enhanced disc sliding capabilities at a relatively reduced cost.

SUMMARY

In one aspect, the disclosed multi-disc brake hub assembly may include a hub defining a central axis, a plurality of guide pins, each of the plurality of guide pins extending from the hub and being generally aligned with the central axis, and a disc having two friction surfaces, the disc defining a plurality of guide pin receiving bores, wherein each of the plurality of guide pin receiving bores are positioned to receive an associated one of the plurality of guide pins therethrough such that the disc is moveable relative to the hub along the central axis.

In another aspect, the disclosed multi-disc brake hub assembly may include a hub defining a central axis and including a body and an annulet, the annulet defining a outer side and an inner side relative to the central axis, a plurality of outer guide pins extending from the annulet on the outer side of the hub, each of the plurality of outer guide pins being generally aligned with the central axis, a plurality of inner guide pins extending from the annulet on the inner side of the hub, each of the plurality of inner guide pins being generally aligned with the central axis, an outer disc defining a plurality of guide pin receiving bores positioned to receive an associated one of the plurality of outer guide pins therethrough, wherein the outer disc is moveable along the plurality of outer guide pins relative to the hub, and an inner disc defining a plurality of guide pin receiving bores positioned to receive an associated one of the plurality of inner guide pins therethrough, wherein the inner disc is moveable along the plurality of inner guide pins relative to the hub.

Also disclosed is a spring for applying a biasing force to a disc of a multi-disc brake hub assembly including a hub, wherein the spring includes a band adapted to circumferentially engage the hub, at least one biasing feature extending generally radially from the band, and at least one slack-absorbing feature adapted to tighten the band about the hub.

Other aspects of the disclosed multi-disc brake hub assembly will become apparent from the following description, the accompanying drawings and the appended claims.

DETAILED DESCRIPTION

Figure 1:
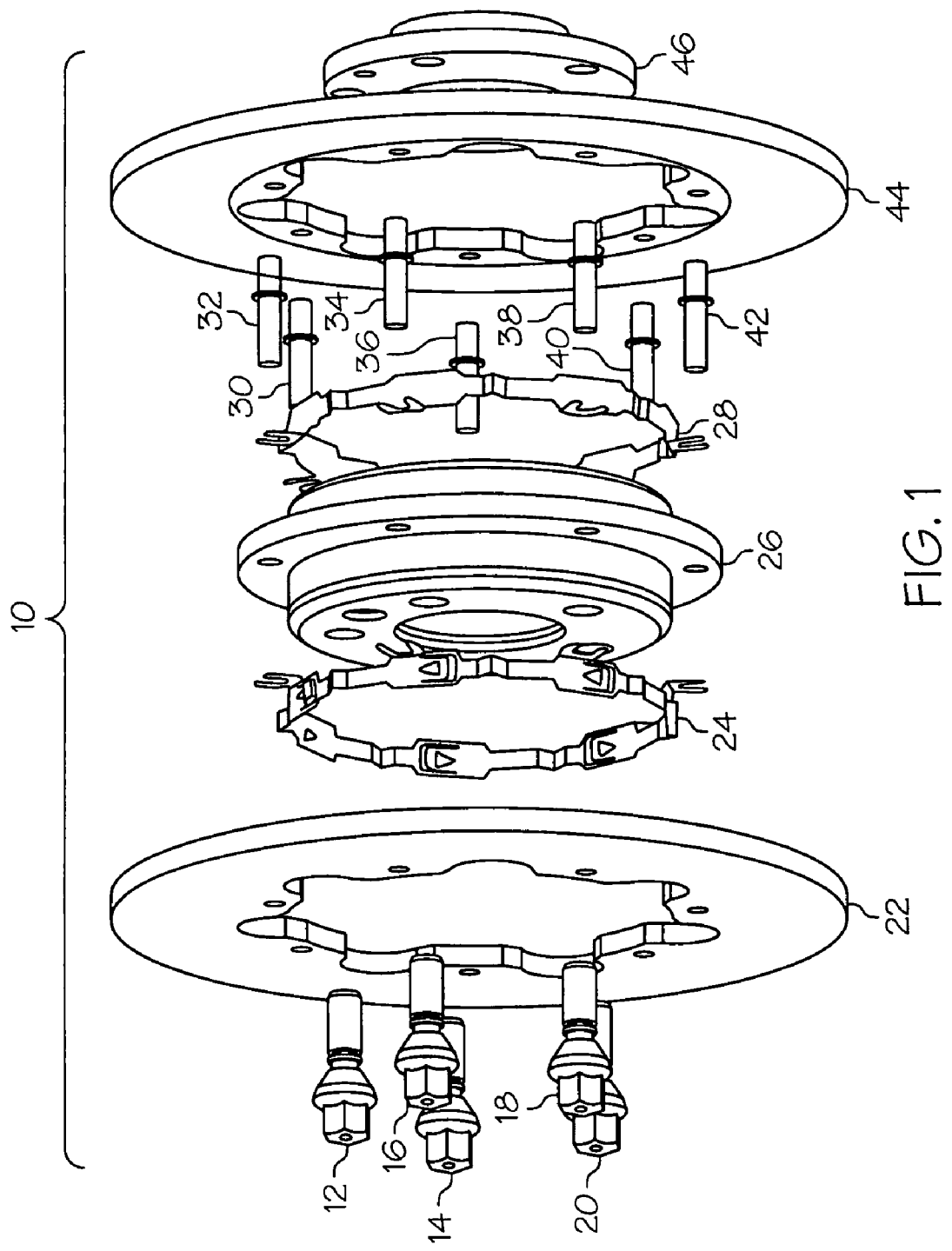
FIG. 1 is an exploded perspective view of one aspect of the disclosed multi-disc brake hub assembly.

Referring to FIG. 1, one aspect of the disclosed multi-disc brake hub assembly, generally designated 10, may include, among other things, connection bolts 12, 14, 16, 18, 20, an outer disc 22, a hub 26, guide pins 30, 32, 34, 36, 38, 40, 42, an inner disc 44 and, optionally an outer one-piece spring 24 and an inner one-piece spring 44. The multi-disc brake hub assembly 10 may be connected to the spindle flange 46 of a bearing assembly (not shown) by the connection bolts 12, 14, 16, 18, 20.

Figure 2:
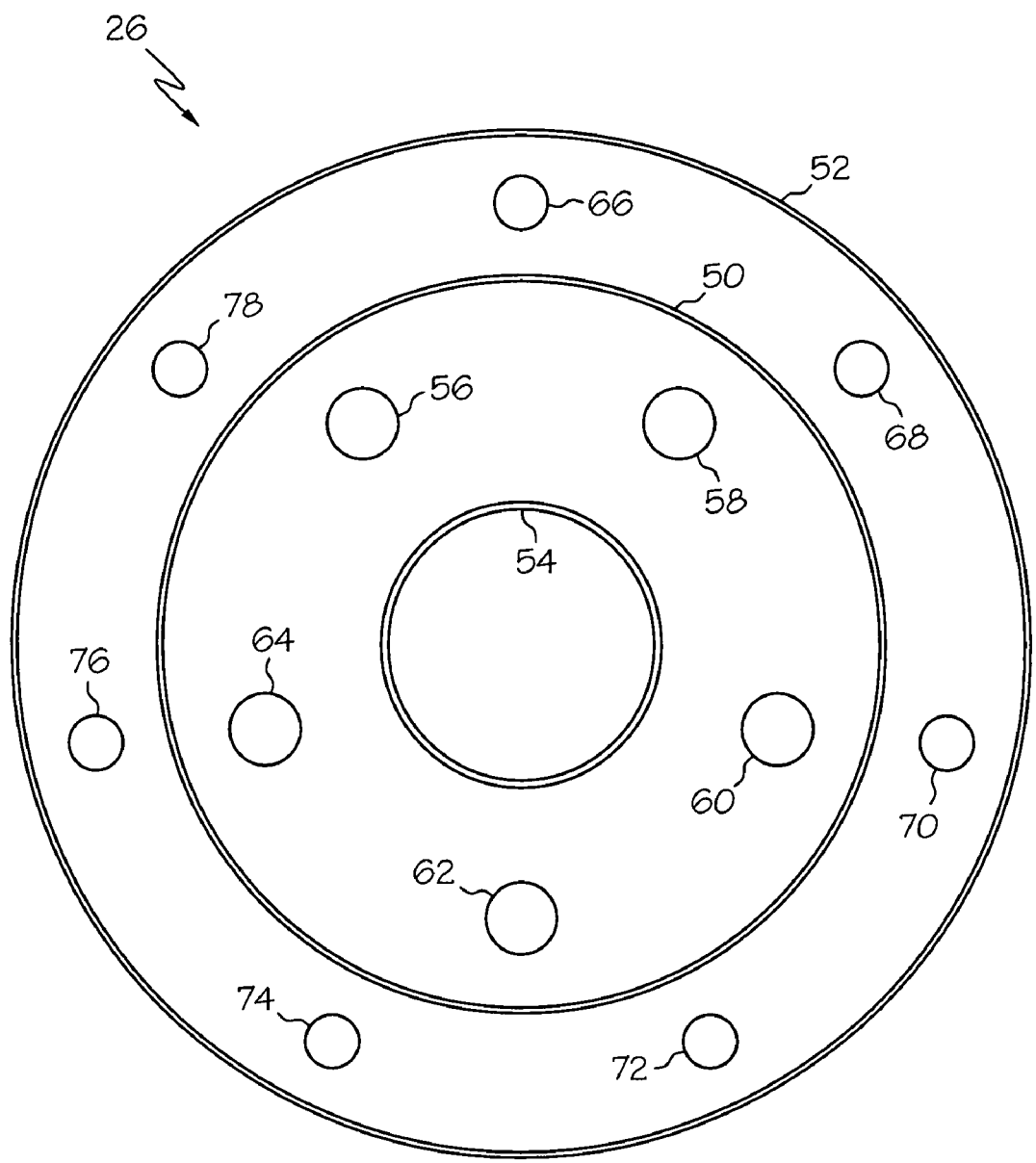
FIG. 2 is a front elevational view of the hub of the multi-disc brake hub assembly of FIG. 1.
Figure 3:
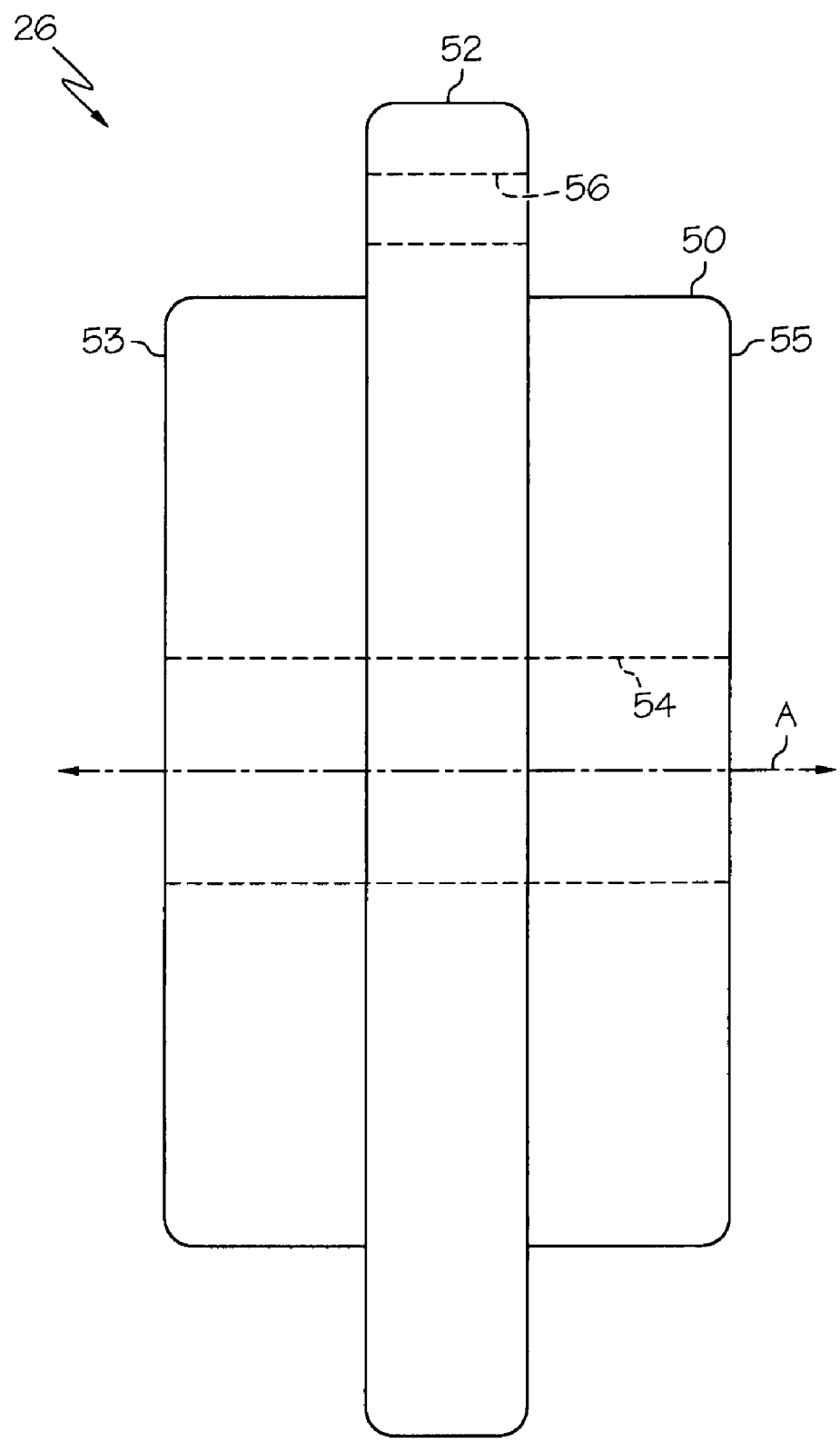
FIG. 3 is a side elevational view of the hub of FIG. 2.

Referring to FIGS. 2 and 3, the hub 26 may include a body 50 and an annulet 52 extending radially from the body 50. The body 50 may be formed as a generally short cylinder and may define a rotational axis A (FIG. 3), a central bore 54 and a plurality of connection bolt receiving bores 56, 58, 60, 62, 64. The annulet 52 may be connected to, or formed integral with, the body 50 and may define a plurality of guide pin securing bores 66, 68, 70, 72, 74, 76, 78. In one aspect, the annulet 52 may be positioned generally centrally on the body 50 relative to the axial length of the body 50.

Those skilled in the art will appreciate that the hub 26 may be formed from various rigid materials, such as metal (e.g., steel), using a variety of metal forming processes, such as casting.

Figure 4:
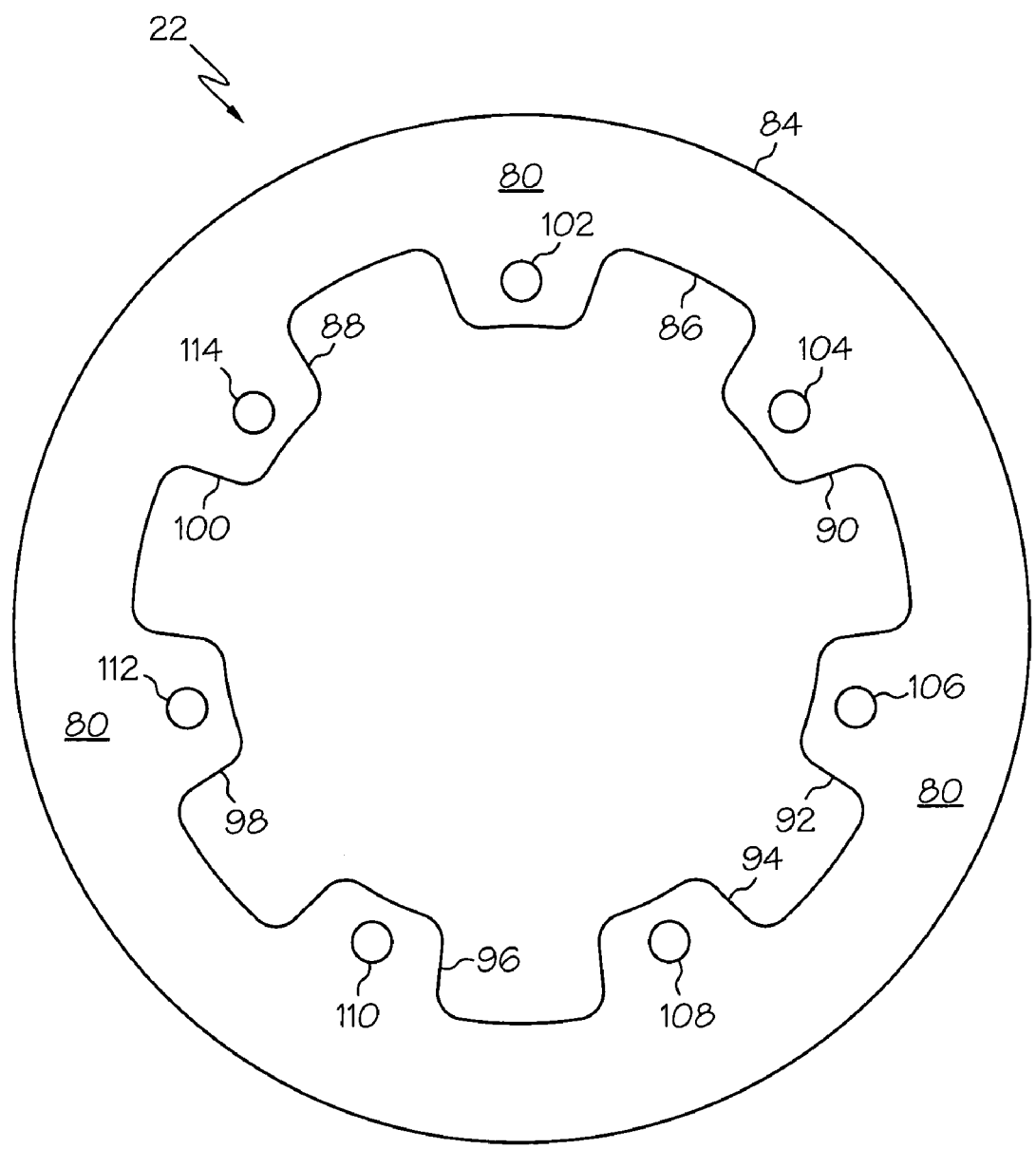
FIG. 4 is a front elevational view of the outer disc of the multi-disc brake hub assembly of FIG. 1.
Figure 5:
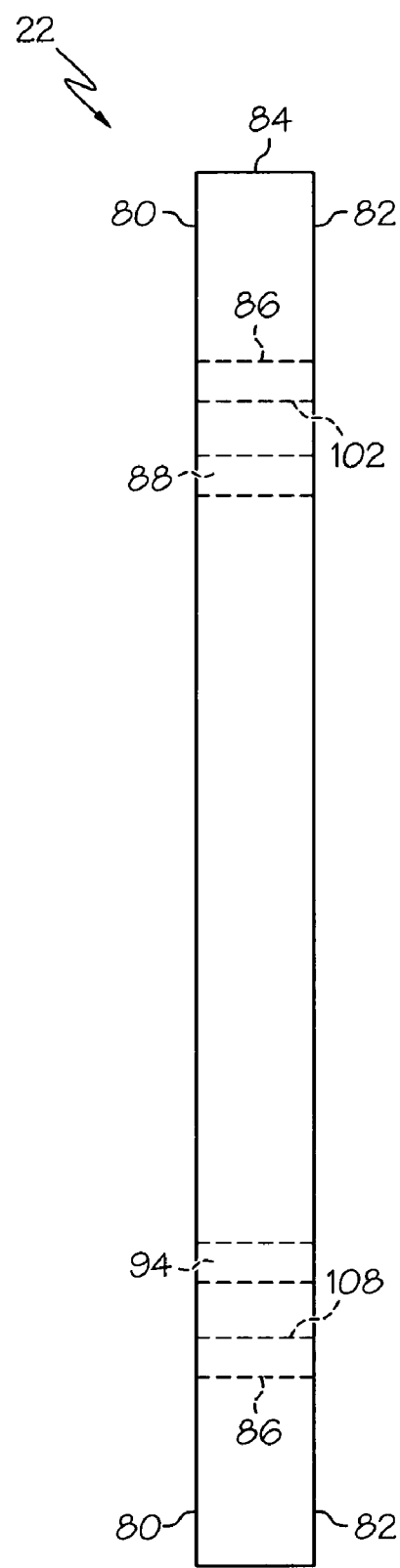
FIG. 5 is a side elevational view of the outer disc of FIG. 4.

Referring to FIGS. 4 and 5, each of the outer 22 and inner 44 discs (only outer disc 22 is shown in FIGS. 4 and 5) may be shaped as a short, hollow cylinder (i.e., an annulus in front view (FIG. 4)) and may include an outer friction surface 80, an inner friction surface 82, an outer radial edge 84, an inner radial edge 86 and a plurality of tabs 88, 90, 92, 94, 96, 98, 100. The tabs 88, 90, 92, 94, 96, 98, 100 may be spaced generally equidistantly (or otherwise) from each other and may extend generally radially inward from the inner radial edge 86. Furthermore, each tab 88, 90, 92, 94, 96, 98, 100 may define a guide pin receiving bore 102, 104, 106, 108, 110, 112, 114. The tabs 88, 90, 92, 94, 96, 98, 100 may be formed integrally with the discs 22, 44 by, for example, casting or machining the discs. However, those skilled in the art will appreciate that alternative means for forming the tabs 88, 90, 92, 94, 96, 98, 100 may be used without departing from the scope of the present disclosure (e.g., welding tabs to the discs).

Figure 9:
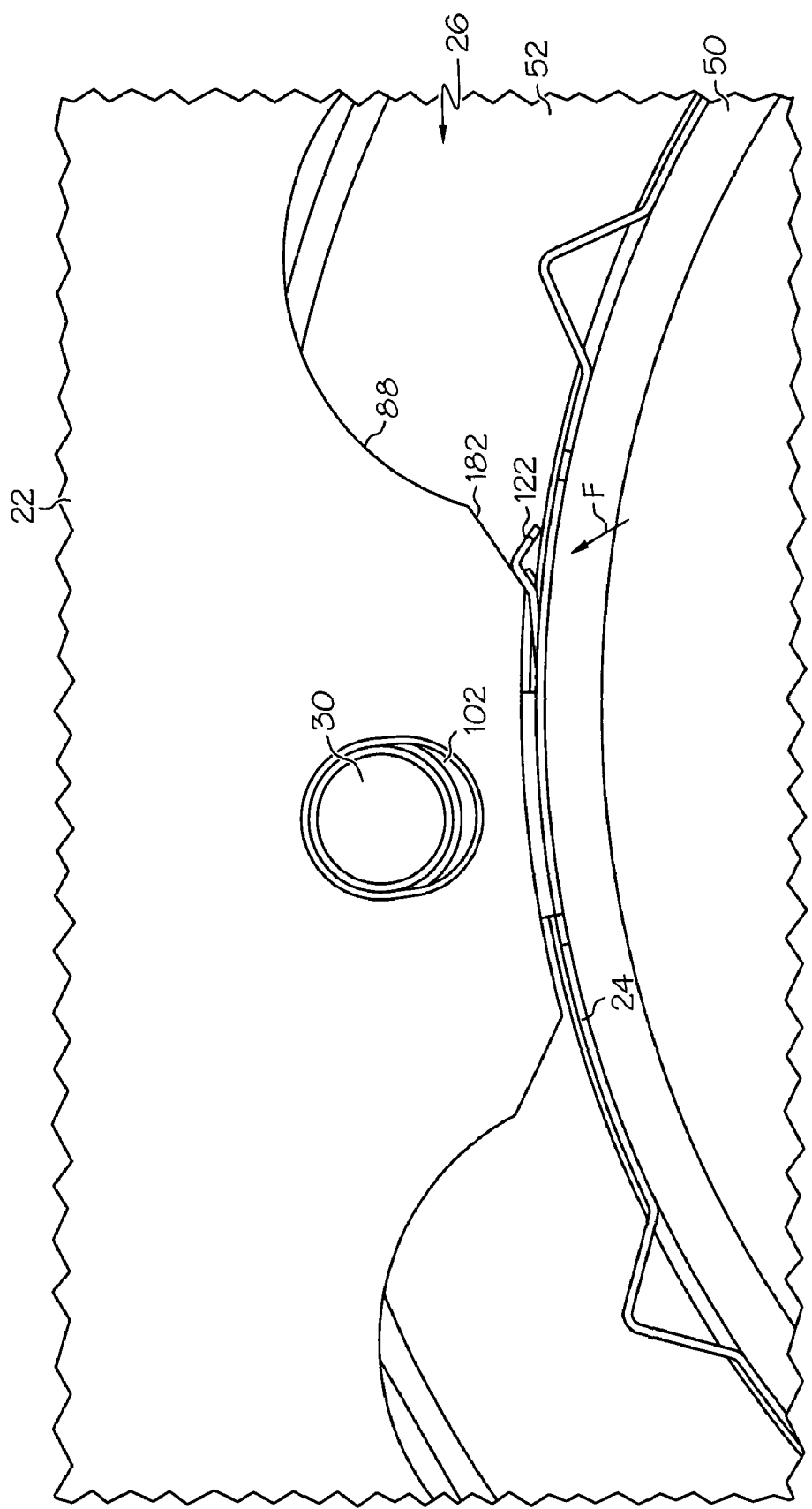
FIG. 9 is front elevational view of a portion of the hub of FIG. 7 showing the outer disc slidably received over the slide pins.

In one aspect, as shown in FIG. 9, the guide pin receiving bores 102, 104, 106, 108, 110, 112, 114 may be formed in the tabs 88, 90, 92, 94, 96, 98, 100 as generally elongated slots, extending in the radial direction, to accommodate thermal expansion in the radial direction. For example, the elongated slots may be obround in shape, depending upon the shape of the guide pins 30, 32, 34, 36, 38, 40, 42.

Figure 7:
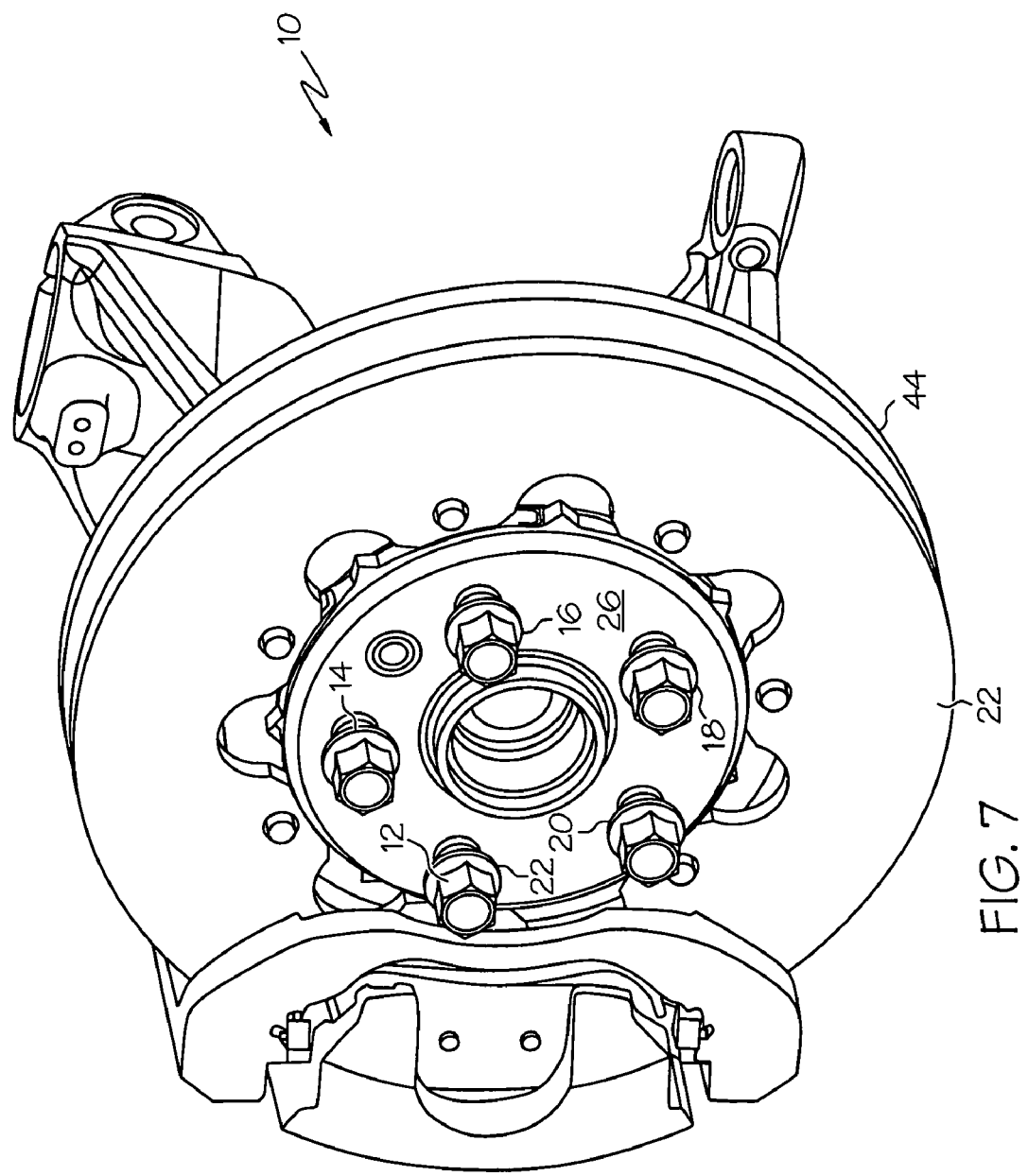
FIG. 7 is a front perspective view of the multi-disc brake hub assembly of FIG. 1 in an assembled configuration.
Figure 8:
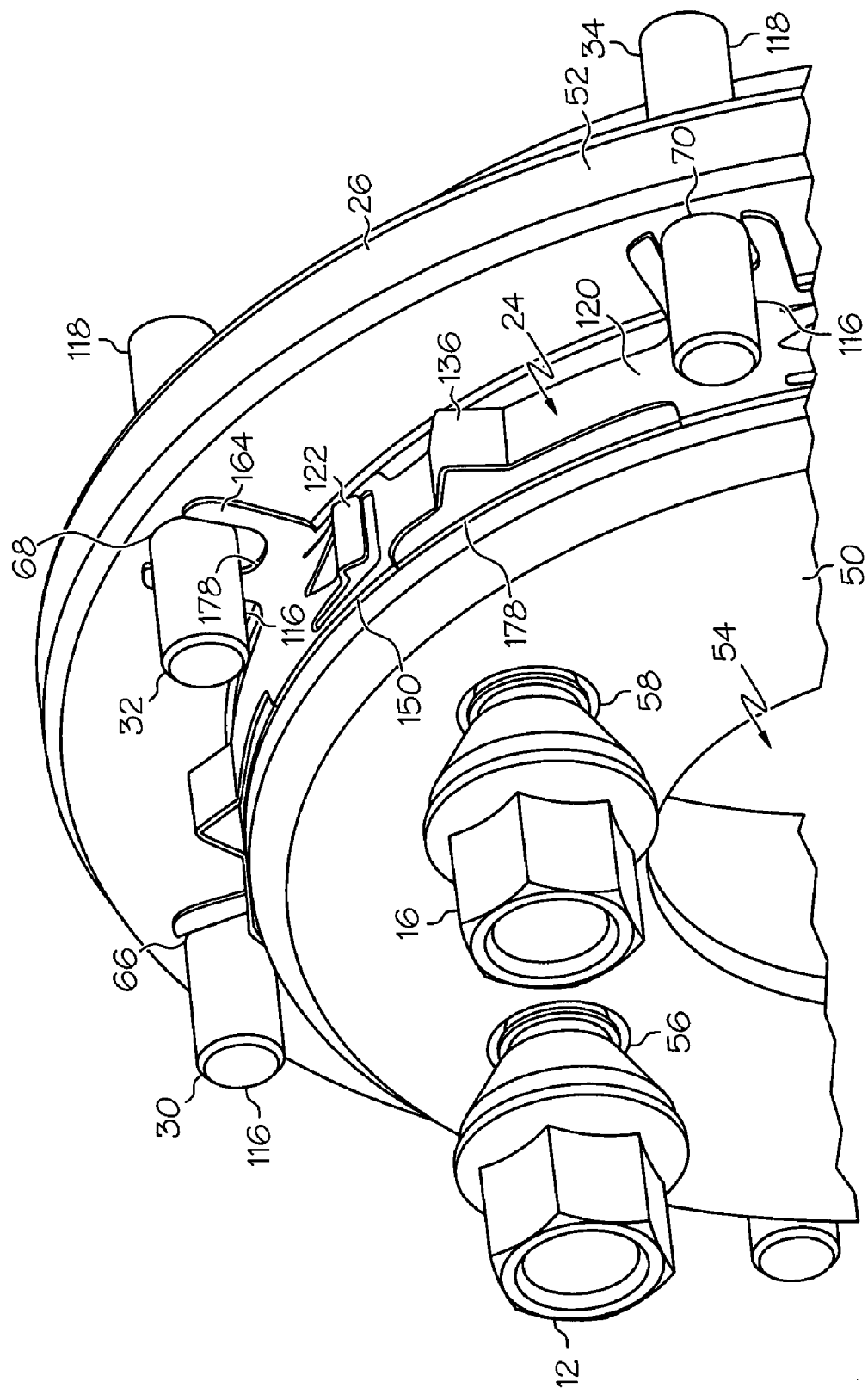
FIG. 8 is a front perspective view of a portion of the hub of the multi-disc brake hub assembly of FIG. 1, showing the guide pins connected thereto.

As shown in FIG. 8, the guide pins 30, 32, 34, 36, 38, 40, 42 may be received through the guide pin securing bores 66, 68, 70, 72, 74, 76, 78 in the hub 26 such that an outer portion 116 of each guide pin extends axially outwardly from the annulet 52 and an inner portion 118 of each guide pin extends axially inwardly from the annulet. While the guide pins 30, 32, 34, 36, 38, 40, 42 may be press fit into the guide pin securing bores 66, 68, 70, 72, 74, 76, 78, as shown in FIG. 7, those skilled in the art will appreciate that the guide pins may be connected to the hub 26 by alternative means, such as welding, or may be formed integrally with the hub 26. Alternatively, rather than a single guide pin 30, 32, 34, 36, 38, 40, 42 forming both the outer 116 and the inner 118 portions discussed above, two separate guide pins may be used to form the outer and inner portions.

In one aspect, the guide pins 30, 32, 34, 36, 38, 40, 42 may be formed from a corrosion resistant material, such as stainless steel. In another aspect, the guide pins 30, 32, 34, 36, 38, 40, 42 may be coated with, or otherwise treated with, a corrosion resistant material. Those skilled in the art will appreciate that the use of corrosion resistant materials may reduce corrosion-induced friction and the risk of disc-to-guide pin seizure.

In one aspect, the disclosed multi-disc brake hub assembly 10 may be assembled, as shown in FIG. 7, by (1) connecting the inner disc 44 to the hub 26 such that the inner portion 118 of each guide pin 30, 32, 34, 36, 38, 40, 42 is received through an associated guide pin receiving bore 102, 104, 106, 108, 110, 112, 114 in the inner disc, (2) connecting the outer disc 22 to the hub 26 such that the outer portion 116 of each guide pin 30, 32, 34, 36, 38, 40, 42 is received through an associated guide pin receiving bore 102, 104, 106, 108, 110, 112, 114 in the outer disc, and (3) passing the connection bolts 12, 14, 16, 18, 20 through the connection bolt receiving bores 56, 58, 60, 62, 64 in the hub 26 to secure the hub to the spindle flange 46 of the knuckle 48. However, those skilled in the art will appreciate that the disclosed multi-disc brake hub assembly 10 may be assembled in a variety of ways without departing from the scope of the present disclosure.

Accordingly, the outer 22 and inner 44 discs may slide generally in the axial direction (axis A, FIG. 3) along the guide pins 30, 32, 34, 36, 38, 40, 42 in response to a braking force applied to the discs 22, 44 by a caliper piston (not shown).

Optionally, as shown in FIG. 1, the multi-disc brake hub assembly 10 may include an outer one-piece spring 24 and/or an inner one-piece spring 28.

Figure 6:
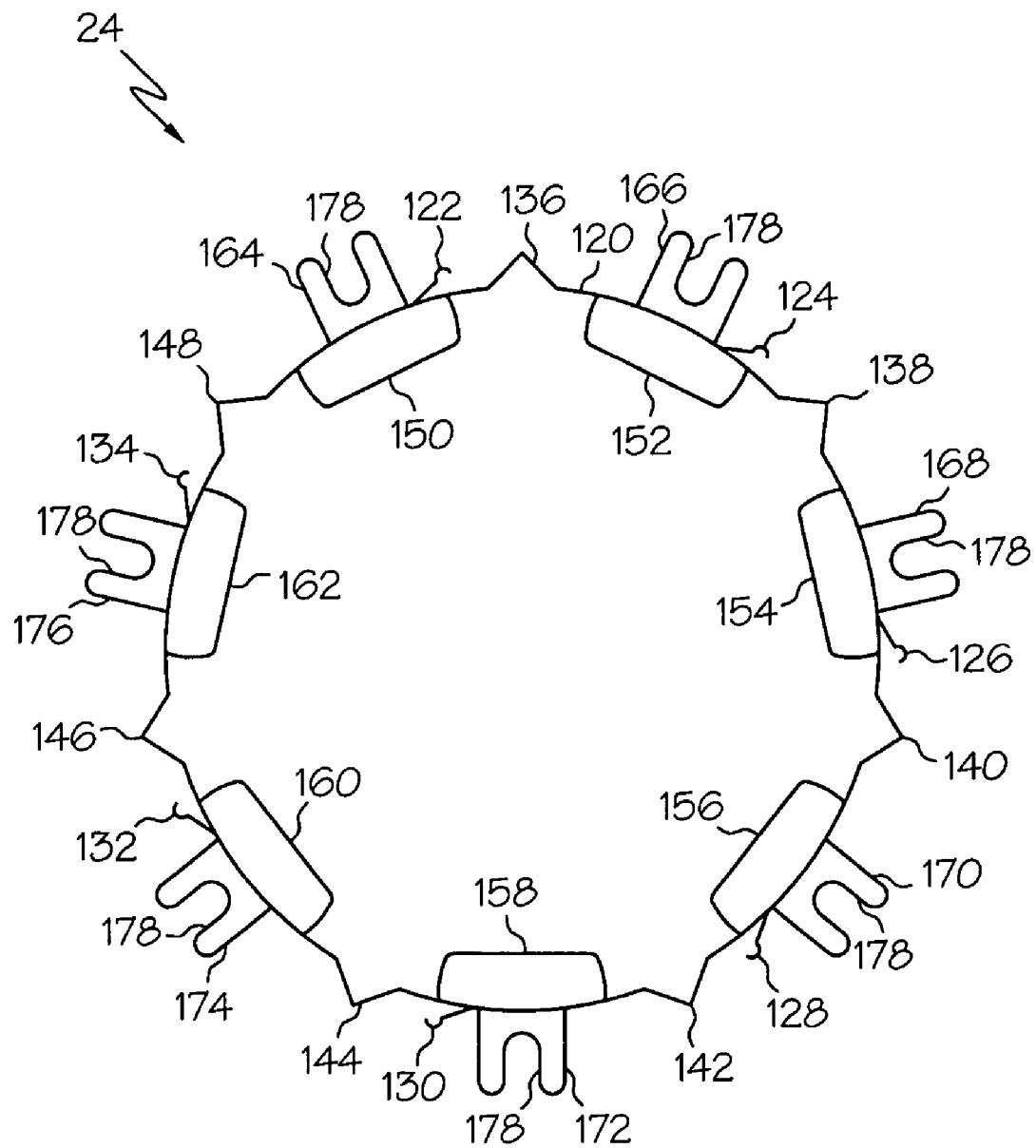
FIG. 6 is a front elevational view of the outer one-piece spring of the multi-disc brake hub assembly of FIG. 1.

Referring to FIG. 6, each of the outer 24 and inner 28 one-piece springs (only the outer one-piece spring 24 is shown in FIGS. 6, 8 and 9) may include a generally continuous band 120, features 122, 124, 126, 128, 130, 132, 134 that bias the spring, and features 136, 138, 140, 142, 144, 146, 148 that take up slack in the spring. The spring may also include axial position retention tabs 150, 152, 154, 156, 158, 160, 162 and circumferential position retention tabs 164, 166, 168, 170, 172, 174, 176 having a guide pin opening 178 therein.

The one-piece spring 24 may be formed from any appropriate rigid material (e.g., steel or the like).

As shown in FIG. 8, the outer one-piece spring 24 may be positioned circumferentially over the outer portion 53 (FIG. 3) of the body 50 of the hub 26. The slack-absorbing features 136, 138, 140, 142, 144, 146, 148 may provide tension to the band 120 by absorbing slack in the band. Therefore, the slack-absorbing features 136, 138, 140, 142, 144, 146, 148 may facilitate a tight tolerance between the outer one-piece spring 24 and the outer portion 53 of the body 50 of the hub 26. The axial position retention tabs 150, 152, 154, 156, 158, 160, 162 may be received in a circumferential groove 178 extending about the body 50 of the hub 26, thereby restricting movement of the outer one-piece spring 24 in the axial direction relative to the central axis A (FIG. 3) of the multi-disc brake hub assembly 10. The circumferential position retention tabs 164, 166, 168, 170, 172, 174, 176 may be positioned to receive (e.g., straddle) an associated guide pin 30, 32, 34, 36, 38, 40, 42 by way of the guide pin opening 178 thereof, thereby restricting circumferential rotation of the outer one-piece spring 24 about the central axis A relative to the hub 26.

As shown in FIG. 9, the each biasing feature 122, 124, 126, 128, 130, 132, 134 may engage an associated tab 88, 90, 92, 94, 96, 98, 100 of the outer disc 22 to apply a biasing force (arrow F) to the tab in both the radial and circumferential directions. A chamfer 182 may be formed in each tab 88, 90, 92, 94, 96, 98, 100 to facilitate the interaction between the biasing springs 122, 124, 126, 128, 130, 132, 134 and the tabs.

The inner one-piece spring 28 may be applied to the inner portion 55 of the body 50 of the hub 26 in a similar fashion as the outer one-piece spring 24 is applied to the outer portion 53 of the body 50 of the hub 26.

Accordingly, those skilled in the art will appreciate that the outer and inner one-piece springs 24, 28 may reduce disc rattle by exerting both a radial and circumferential (relative to axis A) force to the disks 22, 44. Furthermore, those skilled in the art will appreciate that the outer and inner one-piece springs 24, 28 may be used with the disclosed multi-disc brake hub assembly 10, as well as with other (e.g., traditional) multi-disc brake hub assemblies.

Although various aspects of the disclosed multi-disc brake hub assembly have been shown and described, modifications may occur to those skilled in the art upon reading the specification. The present application includes such modifications and is limited only by the scope of the claims.

What is claimed is:

1. A brake hub assembly comprising;
    a hub defining a central axis extending axially and including a body and an annulet,
    said body being of cylindrical shape having a predefined circumference and presenting a radially extending inner face and a radially extending outer face and an axially extending circumferential face extending between said inner face and said outer face,
    said annulet extending radially from said circumferential face of said body,
    a plurality of guide pins extending axially from said annulet,
    at least one disc disposed about said body and having at least two friction surfaces defining a plurality of guide pin receiving bores spaced radially from said central axis,
    said guide pins being slidably disposed in said guide pin receiving bores for coupling said hub and said disc to limit rotational movement between said hub and said disc while allowing axial movement of said disc relative to said hub, a spring including a band disposed circumferentially about said circumferential face of said body of said hub, and characterized by said circumferential face of said hub defining a circumferential groove extending circumferentially about said circumferential face and a plurality of axial position retention tabs circumferentially spaced and extending radially inwardly from said band and engaging said circumferential groove of said body of said hub for preventing axial movement between said spring and said hub along said central axis.

2. An assembly as set forth in claim 1 including a plurality of circumferential position tabs circumferentially spaced and extending radially outwardly from said band of said spring and being generally U-shaped and defining a guide pin opening at least partially engaging one of said guide pins to limit rotational movement between said spring and said hub.

3. An assembly as set forth in claim 2 wherein said axial position tabs and said circumferential position tabs are radially aligned to define an engagement portion width.

4. An assembly as set forth in claim 3 wherein said band has a predetermined natural length less than said predefined circumference of said body of said hub.

5. An assembly as set forth in claim 4 including a plurality of slack-absorbing features defined by an undulation projecting radially outwardly from said band biasing said band to said predetermined natural length.

6. An assembly as set forth in claim 5 wherein said slack-absorbing features are circumferentially spaced along said band and have a slack absorbing feature width less than said engagement portion width.

7. An assembly as set forth in claim 1 including a plurality of circumferentially spaced biasing features defined by a leg extending at a radially outward angle from said band of said spring and having at least one undulation applying a biasing force to one of said tabs of said disc.

8. A brake hub assembly comprising;

a hub defining a central axis extending axially and including a body and an annulet, said body being of cylindrical shape having a predefined circumference and presenting a radially extending inner face and a radially extending outer face and an axially extending circumferential face extending between said inner face and said outer face and said body defining a central bore extending along said central axis and a plurality of connection bolt receiving bores circumferentially spaced and extending axially through said body, said annulet extending radially from said circumferential face of said body and defining a plurality of guide pin securing bores circumferentially spaced and extending axially through said annulet, a plurality of guide pins of cylindrical shape and a corrosion resistant material each being securely mounted in and extending axially from each one of said guide pin securing bores of said annulet, a disc disposed about said body having at least two friction surfaces defining a plurality of guide pin receiving bores circumferentially spaced and a plurality of tabs adjacent said annulet extending radially inwardly from said friction surfaces in equidistant spaced relationship, said guide pins being slidably disposed in said guide pin receiving bores for coupling said hub and said disc to limit rotational movement between said hub and said disc while allowing axial movement of said disc relative to said hub, a spring including a band disposed circumferentially about said circumferential face of said body of said hub and having a predetermined natural length less than said predefined circumference of said body of said hub, a plurality of slack-absorbing features circumferentially spaced and having a slack absorbing feature width and defined by an undulation projecting radially outwardly from said band biasing said band to said predetermined natural, a plurality of biasing features circumferentially spaced and defined by a leg extending at a radially outward angle from said band and having at least one undulation applying a biasing force to one of said tabs of said disc, and characterized by said circumferential face of said hub defining a circumferential groove extending circumferentially about said circumferential face, and a plurality of axial position retention tabs circumferentially spaced and extending radially inwardly from said band and engaging said circumferential groove of said body of said hub for preventing axial movement between said spring and said hub along said central axis, and a plurality of circumferential position tabs circumferentially spaced and extending radially outwardly from said band of said spring and being generally U-shaped and defining a guide pin opening at least partially engaging one of said guide pins to limit rotational movement between said spring and said hub, and said circumferential position tabs being radially aligned with said axial position retention tabs to define an engagement portion width greater than said slack absorbing feature width.

9. A brake hub assembly comprising;

a hub defining a central axis extending axially and including a body and an annulet, said body being of cylindrical shape having a predefined circumference and presenting a radially extending inner face and a radially extending outer face and an axially extending circumferential face extending between said inner face and said outer face and said body defining a central bore extending along said central axis and a plurality of connection bolt receiving bores circumferentially spaced and extending axially through said body, said annulet extending radially from said circumferential face of said body and having an outer annulet face and an inner annulet face and defining a plurality of guide pin securing bores circumferentially spaced and extending axially from said outer annulet face to said inner annulet face, a plurality of guide pins of cylindrical shape and a corrosion resistant material each being securely disposed in each one of said guide pin securing bores and extending axially from both the outer annulet face and the inner annulet face, an outer disc disposed about said body having at least two friction surfaces defining a plurality of guide pin receiving bores circumferentially spaced and a plurality of tabs adjacent said outer annulet face extending radially inwardly from said friction surfaces in equidistant spaced relationship, an inner disc disposed about said body having at least two friction surfaces defining a plurality of guide pin receiving bores circumferentially spaced and a plurality of tabs adjacent said inner annulet face extending radially inwardly from said friction surfaces in equidistant spaced relationship, said guide pins being slidably disposed in said guide pin receiving bores coupling said hub and said outer disc and said inner disc to limit rotational movement between said hub and said outer disc and said hub and said inner disc while allowing axial movement of said outer disc and said inner disc relative to said hub, an outer spring including a band disposed circumferentially about said circumferential face of said hub adjacent said outer annulet face having a predetermined natural length less than said predefined circumference of said body of said hub, an inner spring including a band disposed circumferentially about said circumferential face of said hub adjacent said inner annulet face having a predetermined natural length less than said predefined circumference of said body of said hub, a plurality of slack-absorbing features circumferentially spaced and having a slack absorbing feature width and defined by an undulation projecting radially outwardly from each of said bands biasing said bands to said predetermined natural, a plurality of biasing features circumferentially spaced and defined by a leg extending at a radially outward angle from said band and having at least one undulation applying a biasing force to said one of said tabs of said discs, and characterized by said circumferential face of said hub defining an outer circumferential groove extending circumferentially about said circumferential face adjacent said outer annulet face and an inner circumferential groove extending circumferentially about said circumferential face adjacent said inner annulet face, and a plurality of axial position retention tabs circumferentially spaced and extending radially inwardly from each of said bands and engaging said circumferential grooves of said body of said hub for preventing axial movement between said springs and said hub along said central axis, and a plurality of circumferential position tabs circumferentially spaced and extending radially outwardly from each of said bands and being generally U-shaped and defining a guide pin opening at least partially engaging one of said guide pins to limit rotational movement between said springs and said hub, and said circumferential position tabs being radially aligned with said axial position retention tabs to define an engagement portion width greater than said slack absorbing feature width.

10. A spring for applying a biasing force to a disc of a brake hub assembly including a hub having a circumferential groove and defining a central axis extending axially and at least one disc and a plurality of guide pins for rotatably coupling the hub and the disc comprising;

a band for circumferentially engaging the hub and having a predetermined natural length, a plurality of slack-absorbing features circumferentially spaced and having a slack absorbing feature width and defined by an undulation projecting radially outwardly from said band biasing said band to said predetermined natural length, a plurality of biasing features circumferentially spaced and defined by a leg extending at a radially outward angle from said band of said spring and having at least one undulation for applying a biasing force to the disc, and characterized by a plurality of axial position retention tabs circumferentially spaced and extending radially inwardly from said band for engaging the circumferential groove of the hub and for preventing axial movement between the spring and the hub along the central axis, and a plurality of circumferential position tabs circumferentially spaced and extending radially outwardly from said band and being generally U-shaped and defining a guide pin opening for at least partially engaging one of the guide pins for rotatably coupling the spring and the hub, and said circumferential position tabs being radially aligned with said axial position retention tabs to define an engagement portion width greater than said slack absorbing feature width.

* * * * *